Figure 5:
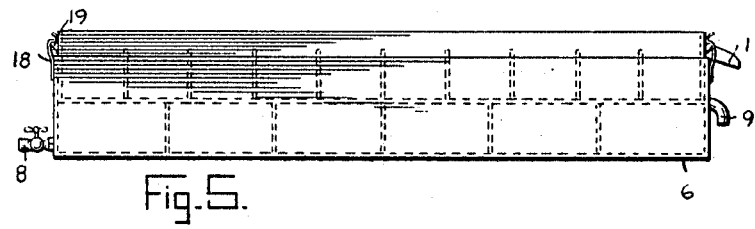

C. W. TICKNOR.
DEVICE FOR AERATING, COOLING, AND CLEANING MILK.
APPLICATION FILED DEC. 9, 1910.
1,003,826.
Patented Sept. 19, 1911.
2 SHEETS—SHEET 1.
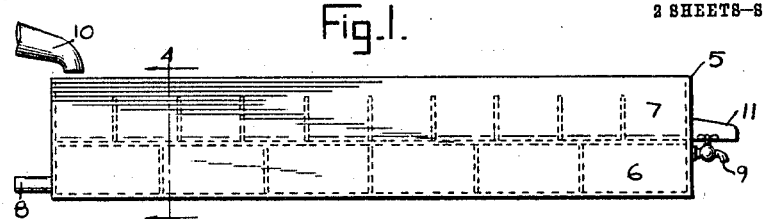
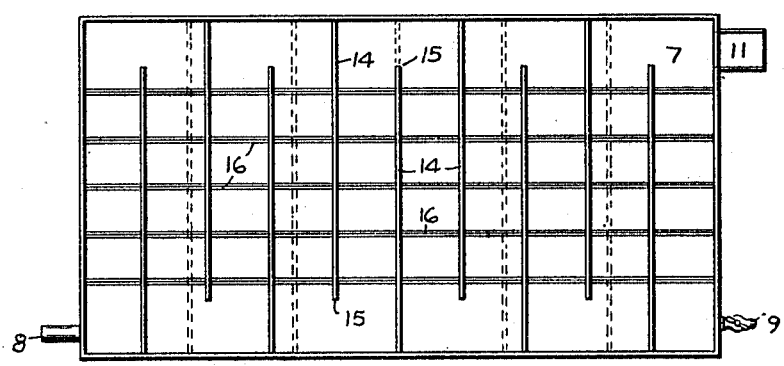
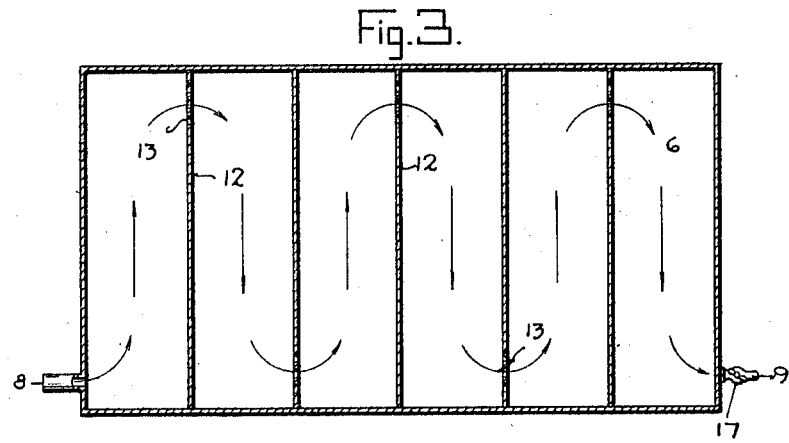
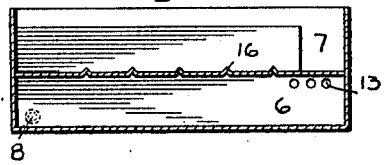
WITNESSES
INVENTOR
Charles W. Ticknor
BY
ATTORNEYS C. W. TICKNOR.
DEVICE FOR AERATING, COOLING, AND CLEANING MILK.
APPLICATION FILED DEC. 9, 1910.

1,003,826.

Patented Sept. 19, 1911.

2 SHEETS—SHEET 2.

WITNESSES
C. K. Reichenbach.
P. B. Marshall

INVENTOR
Charles W. Ticknor
BY
ATTORNEYS

UNITED STATES PATENT OFFICE.

CHARLES W. TICKNOR, OF MOUNT KISCO, NEW YORK.

DEVICE FOR AERATING, COOLING, AND CLEANING MILK.

1,003,826.  Specification of Letters Patent.  Patented Sept. 19, 1911.

Application filed December 9, 1910. Serial No. 596,443.

*To all whom it may concern:*

Be it known that I, CHARLES W. TICKNOR, a citizen of the United States, and a resident of Mount Kisco, in the county of Westchester and State of New York, have invented a new and Improved Device for Aerating, Cooling, and Cleaning Milk, of which the following is a full, clear, and exact description.

My invention relates to devices for aerating, cooling and cleaning milk, and it has for its object to provide a conduit having ribs for collecting any dirt which may be in the milk, the conduit being cooled by an adjoining receptacle containing water, so that the milk will not only be cleaned, but will also be cooled and aerated when passing through the conduit.

Additional objects of the invention will appear in the following complete specification, in which the preferred form of my invention is disclosed.

In the drawings similar characters of reference indicate corresponding parts in all the views, in which—

Figure 6:
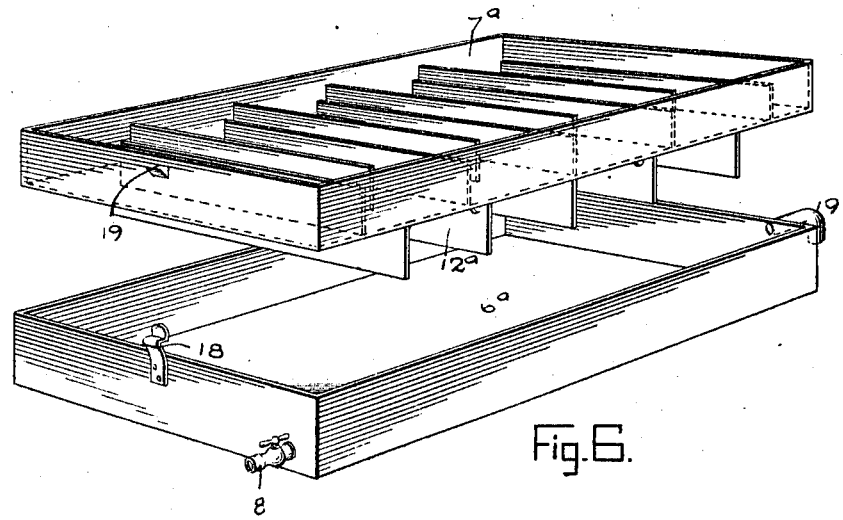

Figure 1 is a side elevation of my device; Fig. 2 is a plan view of Fig. 1; Fig. 3 is a sectional plan view showing the receptacle for containing the cooling medium; Fig. 4 is a sectional view on the line 4—4 of Fig. 1; Fig. 5 is a side elevation of a modified form of the invention; Fig. 6 is a perspective view showing the modified form with the pan raised from the receptacle; and Fig. 7 is a sectional view of Fig. 5, similar to the sectional view shown in Fig. 4 of the form of the invention shown in Fig. 1 of the drawings.

By referring to the drawings it will be seen that a casing 5 is provided having a receptacle 6, over which is disposed a pan 7. The receptacle 6 is provided with an inlet 8, and an outlet 9, and the pan 7 is provided with an inlet 10, and an outlet 11. Extending across the receptacle 6 there is a plurality of partitions 12, having openings or orifices 13, the said openings or orifices 13 in one of the partitions being out of alinement with the orifices or openings in the adjoining partitions. It will therefore be seen that a cooling fluid passing through the receptacle 6 will flow back and forth along the partitions 12. In the pans 7 there are similar partitions 14, openings 15 being formed in the partitions, out of alinement with the openings in the adjoining partitions respectively, so that a winding conduit will be formed, through which the milk may flow from the inlet or spout 10 to the outlet 11. Upwardly extending ribs 16 are formed in the bottom of the pan 7, the function of these ribs 16 being to collect any dirt which may be contained in the milk.

In using the invention cold water is permitted to flow through the receptacle 6, from the inlet 8 to the outlet 9, or when desired the outlet 9 may be closed by a valve 11, to retain the cold water within the receptacle. While I prefer to use cold water as a cooling medium, it will of course be understood that any other cooling medium may be introduced in the receptacle 6 to accomplish the desired result. When the receptacle 6 and the pan 7 have been cooled by the cooling medium in the receptacle 6, milk is introduced into the pan 7 from the inlet or spout 10, the said milk flowing back and forth around the partitions 14, and through the openings 15, which cools and aerates the milk, any dirt contained in the milk being collected by the ribs 16.

Figure 7:
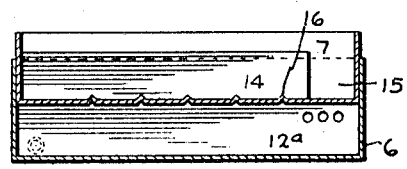

In the modified form of the invention shown in Figs. 5, 6 and 7 of the drawings, the walls of the receptacle $6^a$ are extended upwardly to inclose the lower portion of the pan $7^a$ which is removable. In this form of the invention the partitions $12^a$ are secured to the bottom of the pan $7^a$, so that they may be removed therewith. A clamp 18 is secured to the wall of the receptacle, and engages a cleat 19 on the pan, so that the pan $7^a$ may be locked in place after it has been disposed in the receptacle. In all other respects the device shown in Figs. 5, 6 and 7 of the drawings corresponds with the preferred form of the invention shown in Figs. 1, 2, 3 and 4 of the drawings.

Having thus described my invention, I claim as new and desire to secure by Letters Patent:

A receptacle having an inlet at one end and an outlet at the opposite end, a removable pan normally disposed in the receptacle, partitions in the pan having openings out of registry with each other, partitions depending from the pan and normally disposed in the receptacle, the second-mentioned partitions having openings out of registry with each other, and ribs in the pan, disposed at an angle to the partitions in the
5 pan over which the milk may flow for collecting any dirt which may be contained in the milk.

In testimony whereof I have signed my name to this specification in the presence of two subscribing witnesses.

CHARLES W. TICKNOR.

Witnesses:
ELLA F. BUCKLEY,
RALPH S. CLEMAIN.

Copies of this patent may be obtained for five cents each, by addressing the "Commissioner of Patents, Washington, D. C."